United States Patent

Krumm et al.

[11] 4,399,378
[45] Aug. 16, 1983

[54] FILTER FOR COOLING AIR STREAM OF ELECTRIC COMMUTATOR MOTOR FOR HOUSEHOLD DEVICE

[75] Inventors: Heinz-Gerhard Krumm, Ennepetal; Horst Neugart, Wuppertal, both of Fed. Rep. of Germany

[73] Assignee: Vorwerk & Co. Interholding GmbH, Wuppertal, Fed. Rep. of Germany

[21] Appl. No.: 351,738

[22] Filed: Feb. 24, 1982

[30] Foreign Application Priority Data

Mar. 2, 1981 [DE] Fed. Rep. of Germany ....... 3107879

[51] Int. Cl.³ .............................................. H02K 9/26
[52] U.S. Cl. ...................................... 310/56; 55/130; 339/154 A

[58] Field of Search ...................... 310/63, 56; 55/130, 55/154, 278; 339/154 A

[56] References Cited

U.S. PATENT DOCUMENTS 3,487,610 1/1970 Brown et al. ......................... 55/130
4,261,712 4/1981 Kinkade ........................... 339/154 A Primary Examiner—Donovan F. Duggan
Assistant Examiner—Anita M. Ault
Attorney, Agent, or Firm—Michael J. Striker

[57] ABSTRACT

A filter for a cooling air stream of an electric commutator motor for a household device has a passage into which a cooling air stream flows after passing an electric commutator motor, and a filtering member composed of an electrostatically charged material which coats the passage partially or completely.

13 Claims, 2 Drawing Figures

FILTER FOR COOLING AIR STREAM OF ELECTRIC COMMUTATOR MOTOR FOR HOUSEHOLD DEVICE

BACKGROUND OF THE INVENTION

The present invention relates to a filter for a cooling air stream of an electric commutator motor for household devices.

In electric commutator motors which are built in housings of household devices, a part of the coal dust from the carbon brushes tends to form deposits after long periods of operation. This dust is different in its quantity in dependence upon the type of operation and mounting conditions. For example in a closed cooling circuit, the entire coal dust settles on the inner parts. In a cooling circuit in which the cooling air is released into the atmosphere, a smaller part of the coal dust remains inside. However, in all cases the carbon dust forms after a certain time current-conductive layers which can lead to electrical short-circuiting or no longer satisfy the electrical safety requirements (high-voltage control) at the respective location.

SUMMARY OF THE INVENTION

Accordingly, it is an object of the present invention to provide a filter for a cooling air stream of an electric commutator motor for household devices which avoids the disadvantages of the prior art.

More particularly, it is an object of the present invention to provide a filter for a cooling air stream of an electric commutator motor for household devices, which has means preventing deposition of coal dust, so that safety requirements can be completely satisfied.

In keeping with these objects, and with others which will become apparent hereinafter, one feature of the present invention resides, briefly stated, in a filter for a cooling air stream of an electric commutator motor for household devices, in which a cooling air stream flows from the electric commutator motor into a passage which is completely or partially coated with an electrostatically charged material. The above mentioned material may be an electrostatically charged fibrous material.

When the filter is designed in accordance with the present invention, the electrostatically charged material which coats the passage intercepts the coal dust and thereby cleans the cooling air so that no deposits of coal dust are formed inside.

In accordance with another especially advantageous feature of the present invention, the electrostatically charged material is mounted on a holding element which can be inserted into the passage and withdrawn from the latter.

Still another feature of the present invention is that the electrostatically charged material is arranged so that the cooling air stream flows along a section of the same. The electrostatically charged material may also be arranged so that the cooling air stream passes between two sections of this material.

Still another feature of the present invention is that the electrostatically charged material has portions located transverse to the direction of the cooling air flow, so that the cooling air flow impinges against these portions.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
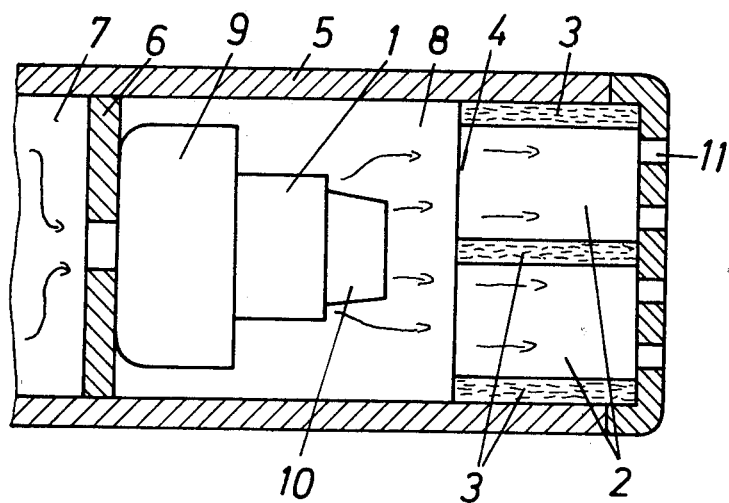
FIG. 1 is a view schematically showing a filter arranged in a housing of a floor vacuum cleaner, in accordance with the present invention.

A filter for a cooling air stream of an electric commutator motor for a household device is shown in FIG. 1. A housing of a floor vacuum cleaner is shown only partially and identified by reference numeral 5. It is provided with an intermediate wall 6 separating an inner space of the housing into a filter chamber 7 and a motor chamber 8. A motor-operated blower unit 9 is mounted on the intermediate wall 6.

The blower unit 9 aspirates air from the filter chamber 7 and supplies it into the motor chamber 8. The electric commutator motor 1 is arranged in the motor chamber 8. The air supplied by the blower unit 9 into the motor chamber 8 absorbs carbon dust of the electric commutator motor 1 in a commutator region 10.

The filter in accordance with the present invention is provided with a passage which is identified by reference numeral 2. A portion of this passage or the whole passage is coated with an electrostatically charged material 3, which may be a fibrous material. When the air with entrained coal dust flows through the passage 2, the coal dust settles on the material 3 because the latter is electrostatically charged. The air does not pass through this material. After this, the cleaned air flows through outlet openings 11 outwardly.

The inventive filter is provided with a holding member 4 which holds the electrostatically chargeable material 3. The holding member 4 is arranged so that it can be inserted into the passage 2 and withdrawn from the latter together with the electrostatically charged material 3.

Figure 2:
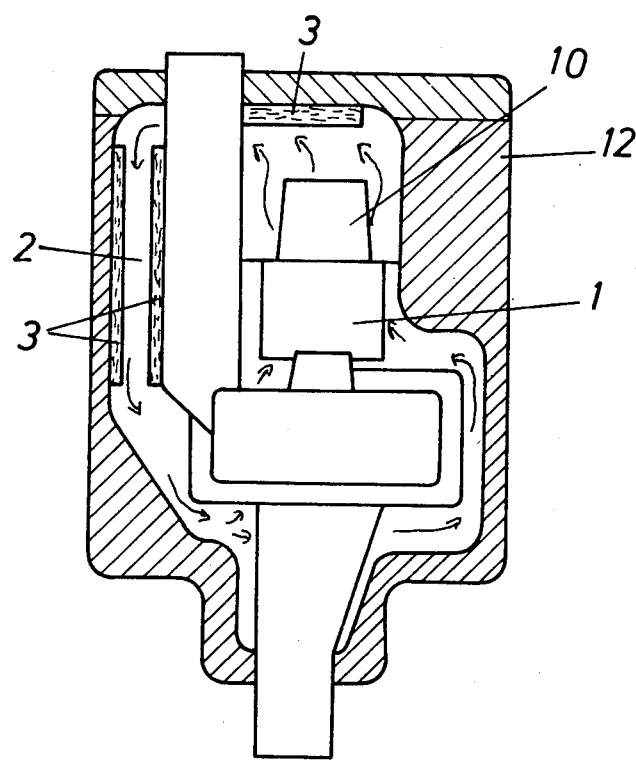
FIG. 2 is a view showing the inventive filter arranged in a closed cooling air circuit.

As can be seen from FIG. 1, the construction shown in this Figure illustrates an open cooling air circuit, or in other words a cooling air circuit in which the cooling air leaves the housing after being cleaned. FIG. 2 shows a housing 12 of the hand-held vacuum cleaner having a so-called closed cooling air circuit. In other words, the cooling air for the electric commutator motor 1 is not discharged outwardly.

The filter in this embodiment also has the passage identified by reference numeral 2 and the electrostatically charged filtering material coating the latter partially or completely. The cooling air absorbs coal dust in the commutator region 10 and flows into the passage 2 provided with the electrostatically charged material 3.

As can be seen from FIG. 2, the electrostatically charged material 3 has two sections which extend substantially in the direction of the cooling air stream. The cooling air stream flows along the sections 3 and between them. In addition to these sections, the electrostatically charged material has a further section 3' which extends in a direction substantially transverse to the direction of the cooling air stream. The section 3' is formed as an impingement member. When the cooling air stream flows from the commutator region 10, it impinges against the section 3' of electrostatically charged material. The coal dust settles on the section 3' also because it strikes against the latter.

It will be understood that each of the elements described above, or two or more together, may also find a useful application in other types of constructions differing from the types described above.

While the invention has been illustrated and described as embodied in a filter for a cooling air stream of an electric commutator motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A filter for a cooling air stream of an electric commutator motor for a household device, comprising means forming a passage into which a cooling air stream flows in a predetermined direction after passing an electric commutator motor; and a filtering member composed of an electrostatically charged material which coats at least a portion of said passage, said electrostatically charged material having a section which extends substantially transverse to said direction, so that the cooling air flow impinges against said section.

2. A filter for a cooling air stream of an electric commutator for a household device, comprising means forming a passage into which a cooling air stream flows in a predetermined direction after passing an electric commutator motor; and a filtering member composed of an electrostatically charged material which coats at least a portion of said passage, said electrostatically charged material having a section extending in said direction, so that cooling air stream flows substantially along said section, said electrostatically charged material also having a further section which extends substantially transverse to said direction, so that the cooling air stream not only flows along said first-mentioned section, but also impinges against said further section.

3. A filter for a cooling air stream of an electric commutator motor for a household device, comprising means forming a passage into which a cooling air stream flows after passing an electric commutator motor; and a filtering member composed of an electrostatically charged material which coats at least a portion of said passage, said passage being substantially closed so that the cooling air stream, upon passing said electrostatically charged material, again circulates in said passage past the electric commutator motor.

4. A filter as defined in claim 1, wherein said filtering member is composed of an electrostatically charged material which completely coats said passage.

5. A filter as defined in claim 1; and further comprising holding means arranged to hold said filtering member of an electrostatically charged material, said holding means including a holding member which is insertable in and withdrawable from said passage together with said filtering member.

6. A filter as defined in claim 1, wherein said filtering member is composed of an electrostatically charged fibrous material.

7. A filter as defined in claim 1, wherein said passage forming means includes a wall, said electrostatically charged material which forms said filtering member coating at least a portion of said wall of said passage.

8. A filter as defined in claim 3, wherein the cooling air stream flows through said passage in a predetermined direction, said electrostatically charged material having a section extending in said direction, so that cooling air stream flows substantially along said section.

9. A filter as defined in claim 8, wherein said electrostatically charged material has a second such section also extending in said direction and spaced from said first-mentioned section, so that the cooling air stream flows between said sections.

10. A filter as defined in claim 3, wherein the cooling air stream flows through said passage in a predetermined direction, said electrostatically charged material having a section which extends substantially transverse to said direction, so that the cooling air flow impinges against said section.

11. A filter as defined in claim 8, wherein said electrostatically charged material has a further section which extends substantially transverse to said direction, so that the cooling air stream not only flows along said first-mentioned section, but also impinges against said further section.

12. A filter as defined in claim 1, wherein said passage is outwardly open so that the cooling air stream leaves said passages upon passing said electrostatically charged material.

13. A filter as defined in claim 1, wherein said passage is substantially closed so that the cooling air stream, upon passing said electrostatically charged material, again circulates in said passage past the electric commutator motor.

* * * * *